United States Patent [19]

Haferl

[11] 4,129,806

[45] Dec. 12, 1978

[54] CORRECTION CIRCUIT FOR LOAD DEPENDENT RASTER DISTORTION

[75] Inventor: Peter E. Haferl, Zurich, Switzerland

[73] Assignee: RCA Corporation, New York, N.Y.

[21] Appl. No.: 830,854

[22] Filed: Sep. 6, 1977

[30] Foreign Application Priority Data

Apr. 14, 1977 [GB] United Kingdom ............... 15545/77

[51] Int. Cl.² ............................................. H01J 29/56
[52] U.S. Cl. .................................................. 315/370
[58] Field of Search ........................ 315/370, 371, 408

[56] References Cited

U.S. PATENT DOCUMENTS 3,968,403  7/1976  Ogawara .............................. 315/371

Primary Examiner—Theodore M. Blum
Attorney, Agent, or Firm—Eugene M. Whitacre; Paul J. Rasmussen; William H. Meise

[57] ABSTRACT

A horizontal deflection circuit drives a load such as an ultor voltage generator which is subject to load variations. Raster distortion is corrected by a switched pincushion correction circuit. Further raster distortion due to load-dependent retrace time modulation is corrected by a corrective circuit which includes a retrace duration sensing circuit for generating a control signal representative of the horizontal retrace pulse duration. The control signal is coupled to the pincushion correction circuit so that it acts additionally in a manner to compensate the load-dependent raster size variations.

14 Claims, 5 Drawing Figures

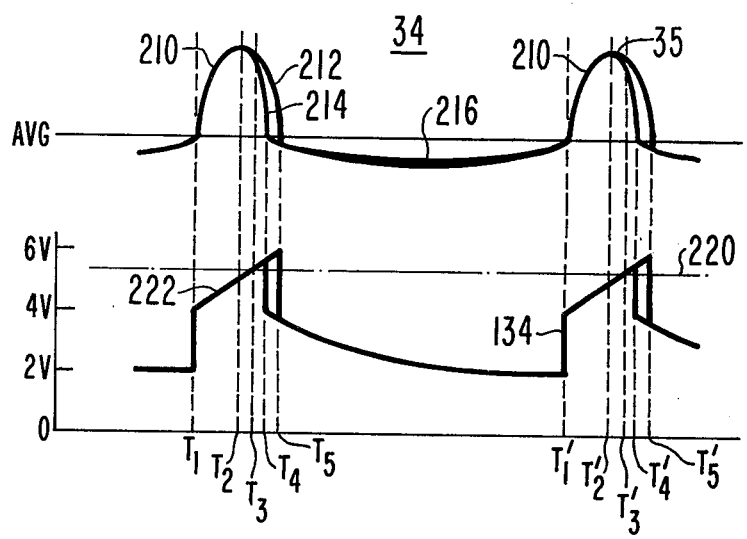
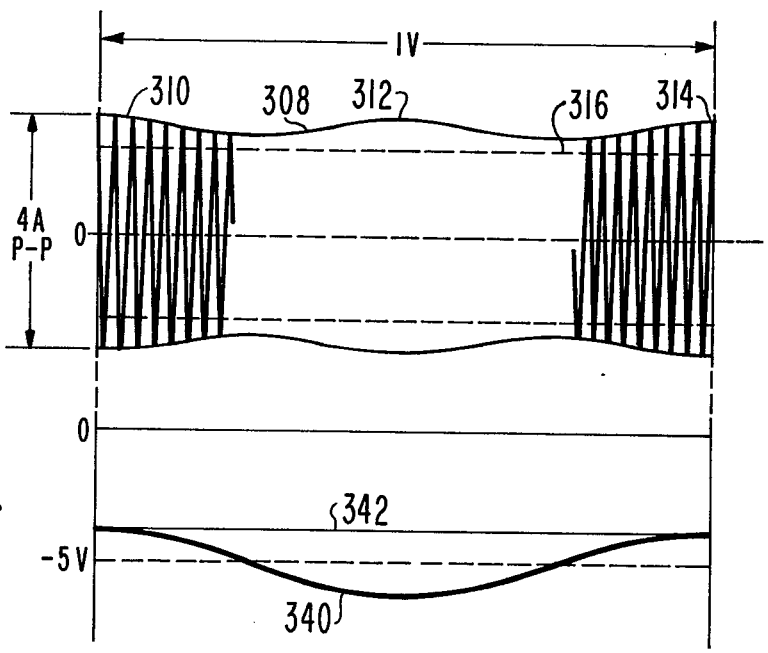

CORRECTION CIRCUIT FOR LOAD DEPENDENT RASTER DISTORTION

BACKGROUND OF THE INVENTION

This invention relates to a correction circuit useful for correcting distortion of the raster of a television display device.

A switched pincushion correction circuit is described in U.S. Patent application Ser. No. 722,600, filed Sept. 13, 1976 for Peter Eduard Haferl and entitled "PINCUSHION CORRECTION CIRCUIT", in which a switched impedance is coupled in series with the horizontal deflection winding. The switch is rendered conductive or closed at a time during the second half of the horizontal retrace interval and remains conductive during the remainder of the horizontal retrace interval and for the entire succeeding trace interval. A switch control circuit changes the switching time during the horizontal retrace interval progressively during the vertical scanning interval. The ratio of the time during which the switch is ON or conductive to the OFF or nonconductive time during the retrace interval varies the effective or average impedance in series with the horizontal winding. The progressive variations in operating time therefore progressively vary the average impedance in series with the horizontal deflection winding at the vertical rate. To provide side pincushion correction, the average impedance in series with the horizontal deflection winding is relatively high at the top and bottom of the vertical scan and relatively low in the center of the vertical scan.

It is customary to energize other circuits of a television receiver from the horizontal deflection circuit. For example, a rectifier and filter are often transformer-coupled to an output of the horizontal deflection generator. A load such as a kinescope ultor or an audio or video amplifier is coupled to the filter and energized by power derived from the horizontal generator. The switched synchronous vertical deflection circuit (SSVD) as described in U.S. Patent application Ser. No. 595,809, filed July 14, 1975 for Peter Eduard Haferl and entitled "SWITCHED VERTICAL DEFLECTION SYSTEM", can also be energized by the horizontal deflection circuit. Such loads can be expected to vary during the normal course of their operation. The SSVD circuit has a load variation which varies in a periodic manner at the vertical deflection rate. The ultor and audio generator vary in consonance with the information content and are not periodic. Both types of load cause a reduction in the width of the horizontal retrace pulses with increasing load.

The load-dependent horizontal pulse-width reduction creates a raster side modulation in addition to the common side pincushion distortions. Loading of the horizontal deflection generator by an SSVD circuit creates periodic raster distortions having the general appearance of side pincushion type distortion, whereas loads having independent variations cause more unpredictable types of raster side distortion. When the aforementioned switched pincushion correction circuit is used this unwanted distortion occurs because the ON time relative to the OFF time of the switch changes when the horizontal retrace duration changes.

SUMMARY OF THE INVENTION

A raster correction arrangement for a television deflection apparatus includes a horizontal deflection generator for producing deflection signals at the horizontal rate and a horizontal deflection winding coupled to an output of the horizontal deflection generator and responsive thereto to produce recurrent retrace. A load circuit is coupled to an output of the horizontal deflection generator and is energized thereby. Variations of the load cause variations of the duration of the retrace pulses, which causes raster distortion. Retrace pulse duration sensing means are coupled to the horizontal deflection generator for generating a control signal representative of the duration of the retrace pulses. A controllable impedance circuit is coupled with the horizontal deflection generator. The control signal is coupled to the controllable impedance means in a manner to compensate for the load-dependent raster distortion.

DESCRIPTION OF THE DRAWINGS

In the drawings, FIGS. 2a and 2b, 3a and 3b, illustrate amplitude-time waveforms representing voltages and currents in the arrangement of FIG. 1.

DESCRIPTION OF THE INVENTION

Figure 1:
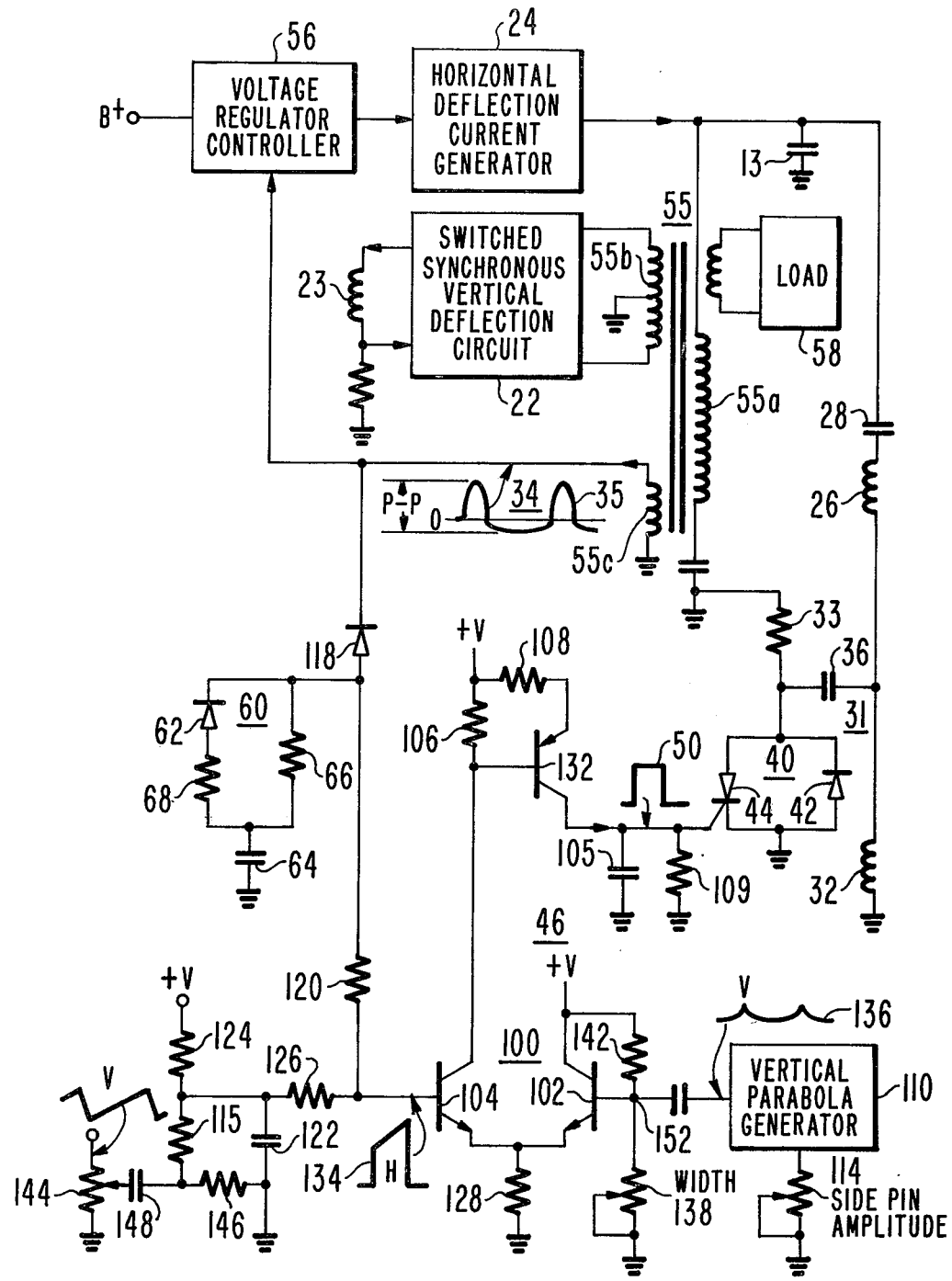
FIG. 1 is a circuit diagram partially in block and partially in schematic form of a television deflection arrangement embodying the invention.

At the top and right of FIG. 1, a horizontal deflection current generator 24 drives a retrace capacitor 13 and a horizontal deflection winding 26 by means of series-connected S-shaping capacitor 28. Horizontal generator 24 also drives the primary 55a of a horizontal transformer 55. A secondary winding 55b of transformer 55 supplies energy during the horizontal retrace interval to a switched synchronous vertical deflection (SSVD) circuit 22 which in turn produces vertical-frequency deflection current through a vertical deflection winding 23. The SSVD circuit acts as a variable load upon the horizontal deflection generator. A further variable load 58 is coupled to transformer 55. A further secondary winding 55c of transformer 55 couples a recurrent sequence designated generally as 34 of horizontal retrace pulses 35 to a voltage regulator controller 56 coupled between a source of energizing potential B+ and generator 24. Controller 56 may be of the known conventional types which regulate the peak magnitude of retrace pulses 35.

Horizontal deflection winding 26 is coupled in series with an impedance network designated generally as 31 and including an inductor 32 and a capacitor 36. Capacitor 36 is periodically coupled in parallel with inductor 32 by a bidirectional switch designated generally as 40 and including a thyristor or SCR 44 antiparalleled with a diode 42.

Switch 40 is controlled by gating pulses represented as 50 applied to the gate of thyristor 44 from a switch control circuit designated generally as 46. Switch control circuit 46 includes a comparator in the form of a differential amplifier designated 100, including first and second emitter-coupled transistors 102 and 104. The joined emitters of transistors 102 and 104 are coupled to ground by a resistor 128. A direct reference voltage is established at point 152 at the base of transistor 102 by a voltage divider including a resistor 142 and variable resistor 138 which acts as a raster width control. A vertical-frequency parabolic voltage shown as 136 is also coupled to the base of transistor 102 from a vertical parabola generator 110. A variable resistor 114 associated with generator 110 controls the amplitude of side pincushion distortion correction by controlling the magnitude of parabolic waveform 136.

Horizontal-rate retrace pulses 35 are coupled to the base of transistor 104 from secondary winding 55c by way of a diode 118 and a resistor 120. The base of transistor 104 is also coupled to a sawtooth forming capacitor 122 and a charging resistor 124 by way of a pedestal forming resistor 126.

The output from differential amplifier 100 is taken from the collector of transistor 104 by way of an inverting amplifier including transistor 132, resistors 106, 108 and 109 and a capacitor 105. This capacitor integrates signals coupled to the gate of SCR 44 by capacitive coupling from the anode, thereby reducing susceptibility to SCR triggering by a rapidly changing anode voltage.

Trapezoidal correction of the raster is provided by potentiometer 144 coupled between a source of vertical-frequency sawtooth waveforms and ground, together with coupling capacitor 148 coupling the tap on 144 to the tap on a voltage divider consisting of resistors 115 and 146. Resistors 115 and 146 are coupled across sawtooth charging capacitor 122.

In operation during the horizontal trace interval, the voltage from secondary winding 55c is slightly negative and diode 118 conducts a constant current through resistors 120 and 126, thereby maintaining transistor 102 conductive and capacitor 122 discharging. Transistor 104 is nonconductive because of bias by resistor 128. With transistor 104 nonconductive, no voltage appears across resistor 106, and transistor 132 therefore does not gate thyristor 44.

During the horizontal retrace interval, the positive-going voltage pulse coupled to the cathode of diode 118 render it nonconductive. This opens the discharge path of capacitor 122, which then begins to charge as represented by waveform 134. Also, the constant current flow through resistors 120 and 126 ceases, due to the nonconduction of diode 118, and the base voltage of transistor 104 rises abruptly to form a pedestal voltage. Each individual voltage pulse 134 consists of a pedestal created by resistor 126 and a superimposed ramp portion created by the charge of capacitor 122 through resistor 124. At the end of the retrace interval, transformer 55 again causes diode 118 to conduct and discharges capacitor 122 to the voltage established by resistors 120, 124 and 126.

In operation, the vertical-frequency component 136 of the reference voltage at point 152 remains substantially constant. The ramp portion of recurrent waveforms 134 is more negative than the reference voltage at point 152 at the beginning of the horizontal retrace interval, but increases to become equal to and exceed the reference value. When waveform 134 is more positive than the reference voltage, transistor 104 will turn on and provide an output pulse to thyristor 44 by way of transistor 132.

The most negative portion of parabola 136 occurs at the midpoint of vertical scan. Consequently, the parabola and sawtooth intersect or achieve the same voltage and thereby provide a pulse 50 at a time which is most advanced relative to the horizontal retrace pulses at the center of vertical scan. At the top and at the bottom of vertical scan, parabola 136 is most positive and intersects pulses 134 relatively late during the retrace pulse, producing a pulse 50 having relatively short duration.

When switch 40 is opened, the entire impedance of inductor 32 appears in series with deflection winding 26. When switch 40 is closed, on the other hand, a low impedance appears in series with the deflection winding. The leading edge of each of gating pulses 50 turns thyristor 44 ON at some time during the horizontal retrace interval. By controlling the length of time during the horizontal retrace interval during which switch 40 is ON, the average or effective impedance in series with deflection winding can be controlled. This in turn allows control of the amount of current in deflection winding 26 at the beginning of the horizontal scanning interval, thereby controlling the deflection magnitude.

The time modulation of the leading edge of pulse 50 as described above modulates the average impedance in series with the deflection winding. When the leading edge of pulse 50 occurs late, switch 40 closes late and the average impedance is high. Conversely, when the leading edge of gating pulse 50 occurs relatively early during the horizontal retrace pulse, as at the center of vertical scan, the average impedance in series with the deflection winding is small, and relatively large deflection current flows. As thus far described, the circuit is similar to that described in the aforementioned U.S. application Ser. No. 722,600.

As mentioned previously, the loading of the horizontal deflection generator by switched vertical deflection circuit 22 causes a shortening of the duration of the horizontal retrace voltage pulse. This occurs because energy is extracted from the resonant circuit including retrace capacitor 13 during the retrace interval. This can be understood by considering that at the center of the horizontal retrace interval, all the retrace energy is stored as voltage on capacitor 13. During the latter half of the horizontal retrace interval, the energy is transferred to the inductive deflection components in a resonant manner. Energy extracted during this process causes the voltage on the retrace capacitor to decrease faster than in the absence of loading. FIG. 2a shows a portion of a recurrent sequence 34 of retrace pulses 35 illustrating duration modulation. In FIG. 2a, the retrace voltage pulse under unloaded conditions is represented by the common boundary line 210 and by line 212. Under loaded conditions, the retrace pulse has a shorter duration and is bounded by lines 210 and 214. The trace interval voltage is negative with respect to the average value and is represented by line 216. As seen on an oscilloscope, line 216 representing the trace-interval voltage is thickened, representing the effect of vertical-frequency modulation. This modulation comes about as a result of changes in the average value of waveform 34 resulting from the pulse duration modulation.

The voltage regulating feedback loop including controller 56 senses the amplitude of pulses 35. Controller 56 will ordinarily be responsive to the peak value of the retrace pulse and acts to hold a constant retrace voltage amplitude for ultor voltage and picture width stabilization. The trace voltage amplitude is a fixed proportion of the retrace voltage amplitude, depending upon the retrace pulse duration. Controller 56 therefore holds a constant amplitude of the retrace pulses but does not correct for retrace pulse duration changes which cause trace voltage changes.

FIG. 2b shows recurrent pulses 134 each including a pedestal and a ramp portion 222. The ramp and pedestal portion begin simultaneously at a time T1 at the beginning of the trace interval. A reference voltage designated 220 is intersected by ramp portion 222 at a time T3. A gating pulse initiates conduction of switch 40 at this time, and current begins to increase quickly in deflection coil 26. Ramp portion 222 ends at the termination of the retrace interval and the pedestal formed by resistor 126 also ends. It can be seen from FIG. 2b that the available time for current increase in the deflection winding in the case of light loading of the retrace pulse extends from time T3 to time T5. When the retrace pulses are heavily loaded as shown by 214 of FIG. 2a, the available time for increasing current in the deflection winding extends only from time T3 to time T4. Consequently, heavy loading has the effect of increasing the effective impedance of the pincushion correction impedance circuit.

Loading of the horizontal deflection generator by a SSVD circuit tends to be a maximum at the top and at the bottom of the vertical scanning interval because the current supplied to the vertical deflection winding is a maximum at these times. Such heavy loading at the top and bottom of the vertical scanning interval reduces the horizontal deflection current as described above. FIG. 3a shows the horizontal deflection current and its envelope 308 over a vertical scanning interval, with maximum loading at points designated 310 and 314 corresponding respectively to top and bottom of the vertical scanning interval. The region designated 312 represents a region of greater horizontal deflection current resulting from lighter loading by the SSVD circuit. Envelope 308 gives rise to a "moustache" shaped raster side distortion. The SSVD circuit may for reasons related to linearity enhancement be operated in an "overlap" mode in which energy which is not used for vertical deflection is essentially dissipated, especially in the center of the vertical scanning interval. This results in a heavier but more constant loading of the horizontal deflection generator and consequently decreased horizontal deflection current, as shown by the envelope designated 316. Other variable loads such as represented by block 58, on the horizontal deflection current generator will produce distortions having other shapes which may not be repetitive at the vertical frequency.

In order to correct for raster distortion resulting from retrace duration modulation, a retrace pulse duration sensing means 60 (FIG. 1) is used. Sensing circuit 60 generally speaking produces a direct potential representative of the retrace pulse duration and couples it to the base of transistor 104 in order to correct the raster distortion resulting from duration modulation. Sensing circuit 60 includes a capacitor 64 coupled to the anode of diode 118 by way of diode 62 coupled in parallel with a resistor 66. A resistor 68 is coupled in series with diode 62. Resistor 68 and capacitor 64 form an integrating circuit which is coupled to the trace-interval voltage appearing at secondary winding 55c. Since the peak value of pulse waveform 34 remains constant, but the pulse duration changes, the trace-interval voltage relative to ground also changes. As the retrace pulse duration becomes shorter, the trace-interval voltage becomes less negative. During the trace interval, capacitor 64 integrates the trace-interval voltage. During the retrace interval, when diodes 62 and 118 are nonconductive, the integrated voltage on capacitor 64 is coupled to differential amplifier 100 as capacitor 64 discharges through resistors 66, 120 and 126. As the loading on the horizontal deflection generator increases and the pulse width decreases, capacitor 64 charges to a less negative or more positive voltage. This voltage is shown for the case of SSVD loading in FIG. 3b. The control signal produced by sensing circuit 60 is shown as waveform 340. Control signal 340 is most positive at the top and bottom of the vertical scan, and most negative at the center of scan. For the "overlap" mode of operation of the SSVD, which represents a constant heavy load, the control signal is more positive still and constant over the vertical interval, as shown by line 342.

The control signal produced by sensing circuit 60 sums with the ramp portion 222 of pulses 134 appearing at the base of transistor 104. With heavier loading, the control signal becomes more positive and acts to trigger the comparator earlier during the retrace interval during each recurrent cycle. This has the effect of reducing the average impedance in series with the horizontal deflection winding, thereby increasing the deflection current in a manner to offset the change in current due to the retrace duration modulation.

The control signal produced by sensing circuit 60 in the presence of loading by an SSVD circuit corrects the moustache distortion resulting from pulse duration modulation. The pincushion correction circuit simultaneously continues to correct the vertical-frequency parabolic raster distortion caused by the kinescope geometry by varying the reference voltage at point 152 at the vertical rate with parabola 136. Thus, pincushion correction continues to be available and controllable in amplitude by resistor 114.

While a switched type pincushion circuit has been used for illustration, modulation of the deflection current occurs whenever the retrace pulse is modulated by loading as by load 58 due to changes in the deflection winding-retrace capacitor resonance. This modulation is corrected by a retrace pulse duration sensing circuit and a controllable impedance arranged to vary the deflection current in an opposing manner.

It will be apparent to those skilled in the art that other embodiments of the invention are possible. For example, the retrace pulse duration sensing circuit could integrate the retrace-interval pulses rather than the trace-interval pulses.

The described invention makes the horizontal deflection current substantially independent of horizontal deflection generator loading, so makes a deflection and pincushion correction arrangement such as that shown in FIG. 1 substantially independent of "overlap" adjustments of the SSVD circuit. The described invention also corrects the indentation of the raster sides caused by strong video modulation such as a horizontal white bar on a gray raster, which is caused by pulse duration changes dependent upon ultor loading. It also improves bending at the top and bottom of vertical lines in the presence of brightness variations. The described invention also corrects for load variations caused by quadrupole winding drive circuits. These load variations may cause raster width modulation near the center of the vertical scanning interval.

In FIG. 1, particular values for selected waveforms and components which were found to provide suitable control in a particular configuration are:

| Waveform | 34 | 55V Peak-to-peak |
|---|---|---|
| Capacitors | 64 | 0.05 µfd (50n) |
| | 105 | 4700 pf (4n7) |
| | 122 | 3300 pf (3n3) |
| Resistors | 66 | 8K2 |
| | 68 | 1K |
| | 106 | 2K2 |
| | 108 | 33 |
| | 109 | 1K |
| | 115 | 27K |
| | 120 | 3K9 |
| | 124 | 4K7 |

-continued

| Resistors | 126 | 1K |
|---|---|---|
| | 128 | 2K2 |
| | 138 | 2K2 to 4K4 variable |
| | 142 | 4K7 |
| | 146 | 47K |

What is claimed is:

1. A raster correction arrangement for a television deflection apparatus, comprising:
 a horizontal deflection current generator for producing deflection signals at the horizontal rate;
 a horizontal deflection winding coupled to said horizontal deflection current generator and responsive to said deflection signals to produce recurrent retrace pulses;
 a load circuit coupled to an output of said horizontal deflection current generator for being energized thereby, variations in the load of said load circuit varying the duration of said retrace pulses in a manner to cause raster distortion;
 retrace pulse duration sensing means coupled to said horizontal deflection current generator for generating a control signal representative of the duration of said retrace pulses; and
 controllable impedance means coupled to an output of said horizontal deflection current generator and to said retrace pulse duration sensing means and responsive to said control signal for compensating said raster distortion.

2. A raster correction arrangement according to claim 1 wherein said controllable impedance means comprises a pincushion correction circuit.

3. A raster correction circuit according to claim 1 wherein said controllable impedance means comprises:
 second impedance means coupled to circuit with said horizontal deflection winding;
 controllable switch means coupled in circuit with said impedance means; and
 switch control means coupled to said horizontal deflection current generator and to said controllable switch means for recurrently operating said controllable switch means during said recurrent retrace pulses and controlling the response to said horizontal deflection winding to said deflection signals in a manner to correct raster distortion.

4. A raster correction circuit in accordance with claim 1 wherein said retrace pulse duration sensing means comprises integrating means coupled to said horizontal deflection current generator.

5. A raster correction circuit in accordance with claim 4 wherein said integrating means is coupled to said horizontal deflection generator by means comprising unidirectional current conducting means.

6. A raster correction circuit in accordance with claim 4 wherein said retrace pulse duration sensing means comprises first and second unidirectional current conducting means for coupling said integrating means with said horizontal deflection current generator during a first portion of each horizontal deflection cycle and for uncoupling said integrating means from said horizontal deflection current generator during a second portion of each horizontal deflection cycle; and
 first coupling means for coupling said integrating means with said controllable impedance means for varying said controllable impedance means in a manner to correct for raster distortion.

7. A raster correction circuit in accordance with claim 4 wherein said integrating means comprises capacitance means serially coupled with resistance means.

8. A raster correction circuit in accordance with claim 7 wherein said resistance means is coupled with said horizontal deflection current generator means by the series combination of first unidirectional current conducting means; and said capacitance means is coupled to said controllable impedance means by second resistance means.

9. A raster correction circuit in accordance with claim 8 wherein said second resistance means is coupled at a first end to said capacitance means.

10. A raster correction circuit in accordance with claim 9 wherein said first unidirectional current conducting means is serially coupled with second unidirectional current conducting means; and said second resistance means is coupled at the end remote from said first end to the juncture of said first and second unidirectional current conducting means.

11. A raster correction arrangement for a television deflection apparatus, comprising:
 a horizontal deflection generator for producing deflection signals at the horizontal rate;
 a horizontal deflection winding coupled to an output of said horizontal deflection generator, and responsive to said deflection signals to produce recurrent retrace pulses having a duration;
 an impedance circuit coupled in circuit with said horizontal deflection winding;
 controllable switch means coupled in circuit with said impedance circuit; switch control means coupled to said horizontal deflection generator and to said controllable switch means for operating said switch at a time during the second half of said recurrent retrace pulses, and for controlling the deflection current in a manner to correct raster distortion;
 a load circuit coupled to an output of said horizontal deflection generator for being energized thereby, variations in said load varying the duration of said retrace pulses and the deflection current in said deflection winding in a manner to cause additional raster distortions;
 retrace pulse duration sensing means coupled to said horizontal deflection generator for generating a retrace pulse duration control signal representative of the duration of said retrace pulses; and
 means coupling said control signal to said switch control circuit for compensating said load-dependent raster distortion.

12. A raster correction arrangement for a television deflection apparatus, comprising:
 a horizontal deflection current generator for producing energy at the horizontal deflection rate;
 a horizontal deflection winding coupled to an output of said horizontal current generator;
 a horizontal transformer coupled to an output of said horizontal deflection current generator;
 a load circuit coupled to an output of said horizontal transformer for being energized thereby, said load being variable at a rate other than at said horizontal rate;
 said raster correction apparatus being characterized by retrace duration sensing means for producing a control signal in response to load-dependent variations in horizontal retrace duration; and impedance means coupled in circuit with said horizontal deflection winding and to said retrace duration sensing means for varying the impedance in circuit with said horizontal deflection winding in a manner to correct load-dependent raster variations.

13. A raster distortion correction circuit for a television display apparatus including horizontal and vertical deflection current generators, comprising:
   a horizontal deflection winding responsive to the horizontal deflection current and responsive thereto to form recurrent trace and retrace pulses each having a respective duration;
   controllable pincushion correction impedance means coupled to said horizontal deflection winding for controlling the magnitude of said horizontal deflection current;
   pincushion control means coupled to vertical deflection current generator for controlling the impedance of said controllable impedance means in a manner to correct pincushion distortion;
   variable load means coupled to an output of the horizontal deflection current generator and causing variations in the duration of said trace and retrace pulses and further raster distortion; and
   retrace pulse duration sensing means coupled to the horizontal deflection current generator and to said pincushion control means for varying the impedance of said controllable impedance means in a manner to correct said further distortion.

14. A raster distortion correction arrangement for a television deflection apparatus including a vertical deflection current generator and comprising:
   a horizontal deflection winding;
   a horizontal deflection generator coupled to said horizontal deflection winding for producing recurrent deflection pulses having stabilized amplitude at said horizontal deflection winding;
   variable load means coupled to an output of said horizontal deflection generator, said variable load causing variations in the duration of said recurrent deflection pulses so as to cause raster distortion;
   pulse duration sensing means coupled to said horizontal deflection generator for generating a control signal representative of the duration of said recurrent deflection pulses; and
   controllable means coupled to said horizontal deflection generator and to said pulse duration sensing means and responsive to said control signal for correcting said raster distortion.

* * * * *